United States Patent
Gupta (10) Patent No.: US 9,361,211 B2
(45) Date of Patent: Jun. 7, 2016

(54) AUTOMATED GENERATION OF TEST CASES FOR REGRESSION TESTING

(71) Applicant: CA, INC., Islandia, NY (US)

(72) Inventor: Saravana Gupta, Hyderabad (IN)

(73) Assignee: CA, Inc., New York, NY (US)

( * ) Notice: Subject to any disclaimer, the term of this patent is extended or adjusted under 35 U.S.C. 154(b) by 163 days.

(21) Appl. No.: 14/201,140

(22) Filed: Mar. 7, 2014

(65) Prior Publication Data

US 2015/0254173 A1     Sep. 10, 2015

(51) Int. Cl.
  *G06F 11/00*  (2006.01)
  *G06F 11/36*  (2006.01)
(52) U.S. Cl.
  CPC .................... *G06F 11/3688* (2013.01)
(58) Field of Classification Search
  CPC ........................................... G06F 11/36
  USPC ............ 714/38.1, 38.11, 38.12, 38.13, 38.14; 717/124, 126
  See application file for complete search history.

(56) References Cited

U.S. PATENT DOCUMENTS

| | | | | |
|---|---|---|---|---|
| 5,233,611 A | * | 8/1993 | Triantafyllos | G06F 11/3688 714/46 |
| 5,335,342 A | * | 8/1994 | Pope | G06F 11/3672 714/38.13 |
| 7,373,636 B2 | * | 5/2008 | Barry | G06F 11/3672 714/E11.208 |
| 8,276,123 B1 | * | 9/2012 | Deng | G06F 11/368 714/37 |
| 2007/0168734 A1 | * | 7/2007 | Vasile | G06F 11/3672 714/33 |
| 2013/0042222 A1 | | 2/2013 | Maddela | |

OTHER PUBLICATIONS

Wikipedia—The free encyclopedia, "Regression Testing", downloaded Jan. 21, 2014 from http://en.wikipedia.org/wiki/Regression_testing.com , 1 pp.

* cited by examiner

*Primary Examiner* — Dieu-Minh Le
(74) *Attorney, Agent, or Firm* — Myers Bigel & Sibley, P.A.

(57) ABSTRACT

Systems, methods and computer program products for performing software regression testing are disclosed. The systems, methods and computer program products are configured to execute a test case against an application under test on a programmable digital computer, to obtain from the programmable digital computer an identity of a first code module invoked by the test case, to associate the test case identifier with the first code module, to identify a second code module that is related to the first code module, and to associate the test case identifier with the second code module.

15 Claims, 6 Drawing Sheets

AUTOMATED GENERATION OF TEST CASES FOR REGRESSION TESTING

FIELD

Some embodiments described herein relate to software testing, and in particular to regression testing of software.

BACKGROUND

Various commercial and open-source tools exist to assist with the automation of test cases for software testing. The automation of test cases requires developing a comprehensive approach to test all of the functional areas that the software is deployed on. This may involve test cases invoked on duplicative frameworks to fully test software applications with existing tools. For example, one test case may be required to test a functional area such as a website user interface, whereas a separate test case may be required to automate CLI test case scenarios used in connection with the website. Likewise, if a user wants to implement testing of a Java application and a web service running components of this Java application, the user may build separate components to consume each of the Java application and the web service.

Once suitable test cases have been designed and selected, automated testing systems can automatically execute the test cases using the application under test and verify the performance of the application under test.

Typically, software components are continually updated by their authors to provide new functionality, fix bugs, ensure interoperability with new versions of other software or operating systems, etc. It is desirable to test updated software components before the revisions are released to users.

Such testing, referred to as regression testing, is designed to identify if any new software bugs, or regressions, have been introduced into an application after the application has been changed. Regression testing may be further designed to determine whether a change in one part of the application has affected other parts of the application, which is a common occurrence.

Regression testing typically involves re-running the original test cases that were performed when the application was initially developed and checking to see whether any new faults have been introduced or previously fixed faults have re-emerged. It may not be necessary to execute all of the test cases against the application under test during regression testing, as not all of the test cases may invoke the changed code. Thus, a large part of regression testing includes systematically selecting an appropriate set of tests needed to adequately cover a particular change. However, a regression test that only addresses changed portions of code may not adequately test the application.

SUMMARY

Systems, methods and computer program products for performing software regression testing are provided. The systems, methods and computer program products are configured to execute a test case against an application under test on a programmable digital computer, to obtain from the programmable digital computer an identity of a first code module invoked by the test case, to associate the test case identifier with the first code module, to identify a second code module that is related to the first code module, and to associate the test case identifier with the second code module.

Associating the test case identifier with the first code module may include adding the test case identifier to source code for the first code module, and associating the test case identifier with the second code module may include adding the test case identifier to source code for the first code module.

The systems, methods and computer program products may be further configured to determine that source code for the first code module has changed, to identify the test case identifier associated with the first code module, and to execute the test case associated with the test case identifier using the application under test.

The first code module may include a class or a method, and the first code module may include a first class. The second code module may include a child class of the first class.

The first code module may include a class or a method, and the first code module may include a first class. The second code module may include a parent class of the first class.

The first code module may include a first method, and the second code module may include a second method that overrides the first method.

Obtaining from the programmable digital computer an identity of the first code module invoked by the test case may include determining identities of classes or methods invoked by the application under test while executing the test case.

Identifying the second code module that is related to the first code module may include identifying code modules in the application under test that are called by the first code module.

Identifying the second code module that is related to the first code module may include identifying code modules in the application under test that call the first code module.

It is noted that aspects of the inventive concepts described with respect to one embodiment may be incorporated in a different embodiments although not specifically described relative thereto. That is, all embodiments or features of any embodiments can be combined in any way and/or combination. These and other objects or aspects of the present inventive concepts are explained in detail in the specification set forth below.

Other systems, methods, or computer program products will be or become apparent to one with skill in the art upon review of the following drawings and detailed description. It is intended that all such additional systems, methods, or computer program products be included within this description, be within the scope of the present inventive concepts, and be protected by the accompanying claims.

BRIEF DESCRIPTION OF THE DRAWINGS

The accompanying drawings are included to provide a further understanding of the disclosure and are incorporated in and constitute a part of this application. In the drawings.

DETAILED DESCRIPTION OF EMBODIMENTS

Embodiments of the present inventive concepts now will be described more fully hereinafter with reference to the accompanying drawings. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "or" is used nonexclusively to include any and all combinations of one or more of the associated listed items.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes" or "including" when used herein, specify the presence of stated features, integers, steps, operations, elements, or components, but do not preclude the presence or addition of one or more other features, integers, steps, operations, elements, components, or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments described herein provide systems or methods for identifying, selecting or executing test cases for use in regression testing of software having components that have changed. According to some embodiments, test case IDs may be inserted into the source code of application modules during initial testing. The test case IDs may be inserted not only into application modules that are invoked by the test case, but also into other application modules that are related to the invoked application modules. During regression testing, test case IDs may be extracted from the changed code modules, and regression testing may be performed by the test cases associated with the extracted test case IDs.

Figure 1:
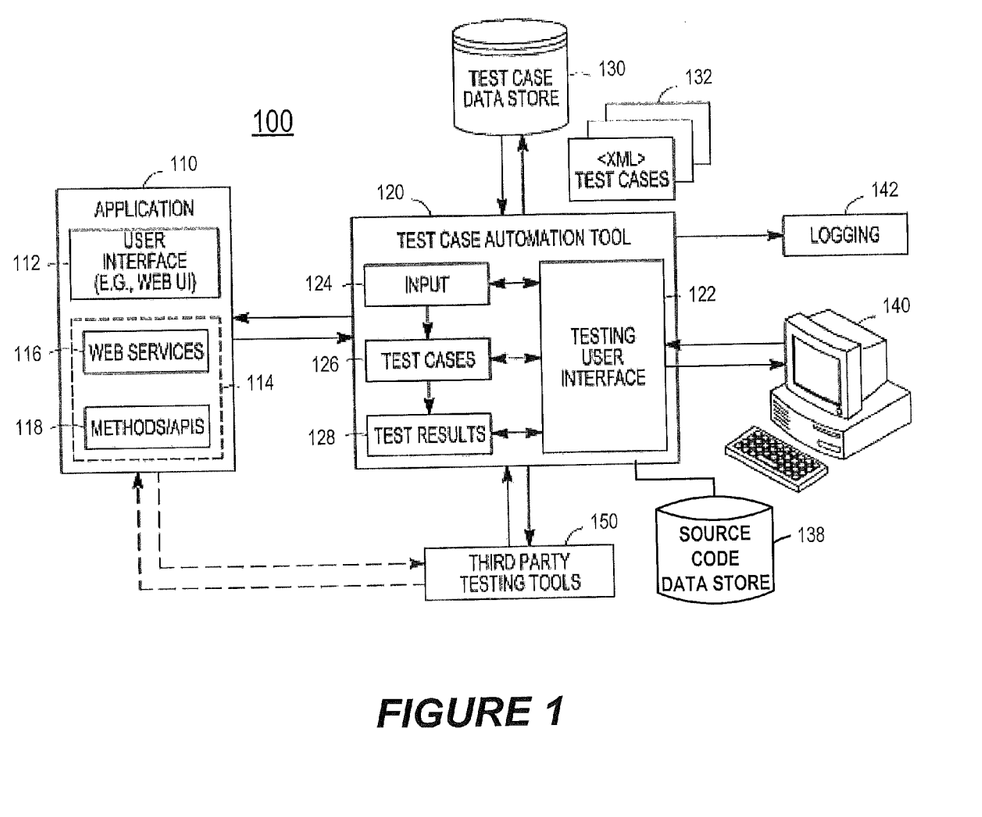
FIG. 1 is a block diagram illustrating a test case automation tool and a software application under test according to some embodiments.

FIG. 1 is a block diagram illustrating an automated system 100 for the testing of software application 110 using features of a test case automation tool 120. As shown, the software application 110 may include a variety of features including a user interface 112 and components 114, such as web services 116 and methods or APIs 118 (e.g., Java methods exposed in the compiled software application).

The test case automation tool 120 is configured to communicate with the software application 110 during the testing of the specific application interfaces and components, such as the user interface 112, web services 116, and methods or APIs 118. The test case automation tool 120 may be configured to provide a unified location for the creation, maintenance, and execution of automated test cases, and be exposed to a test user through a testing user interface 122. For example, test case automation tool 120 functionality may be provided by interfaces, data, and various test development and execution techniques provided through a collection of input 124 for the test cases, the automation of a set of defined test cases 126, and various production and reporting features in connection with test results 128.

The test case automation tool 120 may be configured to store and retrieve test cases and associated test case data in a data store 130. In some embodiments, automated test cases and data associated with the automated test cases are maintained through a series of XML test case definitions 132 that are stored and communicated between the data store 130 and the test case automation tool 120. Each of the test case definitions 132 may have an associated test case identifier, or test case ID.

A source code data store 138 may store source code of the application under test. The source code in the source code data store 138 may be accessed as described below to relate test case IDs to particular portions of the source code according to some embodiments.

The test case automation tool 120 may create and consume automated test cases 126 in an XML format provided by the XML test case definitions 132. Creation of the test cases in an XML format rather than with the use of scripting language may provide the ability for subsequent modification and use of the test cases and test sets without compilation or specialized scripting/programming knowledge.

Related test cases may be generated in one or more test sets or other like groupings. In one embodiment, test sets are structured as XML files to contain the test case definitions 132 for a series of test cases. For example, an XML file may be generated when a new test set is created. Each XML file name may start with the test set name defined in the testing user interface 122 for simplicity, and provide the series of test cases in XML format with appropriate XML fields and data throughout the XML file of the test set.

The test case automation tool 120 may provide various interfaces in a connection with the creation and execution of an automated test, such as through use of a testing user interface 122 that is exposed to testing users and administrators. The test case automation tool 120 may therefore provide an intuitive way to automate test cases through a single testing user interface 122 without requiring specialized code from a testing user, and while using frameworks and functionality from existing third party tools and utilities.

For example, the test case automation tool 120 may provide the testing user interface 122 for access by a plurality of authorized remote testing users at testing system 140, such as through standalone software application running on the testing system 140. A testing user may receive further information regarding the status of the test results and operations through logging 142 or like alerts and debugging messages.

Third party testing tools 150 may be integrated directly into operations designed and executed by the test case automation tool 120. Specifically the test case automation tool 120 may provide a series of method calls and operating instructions to configure and control the third party testing tools 150 during design and execution of an automated test case. Alternatively, the test case automation tool 120 may provide its own custom functionality, logic, and custom methods to design and execute the various testing actions upon the software application 110 without use of third party testing tools 150.

Figure 2:
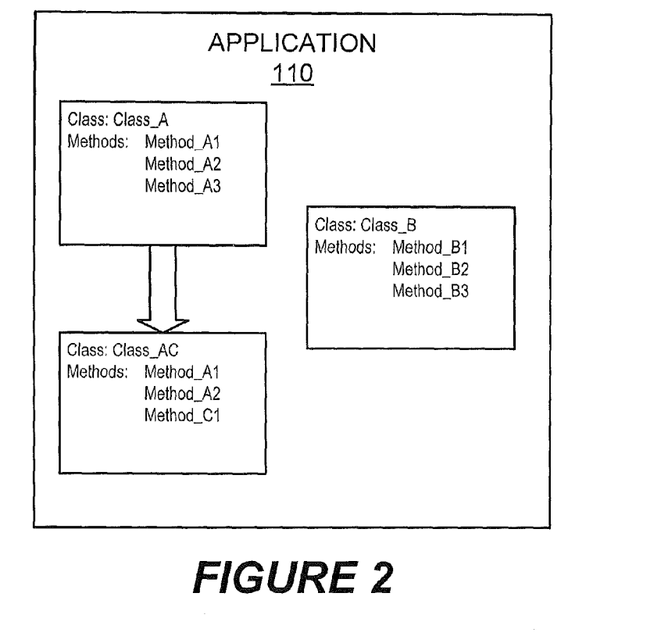
FIG. 2 is a block diagram illustrating functional portions of an example application under test.

FIG. 2 is a block diagram of an application 110 that is written in an object-oriented programming language, such as Java or C++. The application 110 includes a plurality of classes, i.e., Class_A, Class_B and Class_AC. In object oriented programming, objects are defined as instances of a class. Each of the classes may include one or more methods, which are functions tied to the class within which they are defined. As is well known in the field of object-oriented programming, classes may inherit properties from other classes, referred to as inheritance. Classes can inherit attributes, including methods, from pre-existing classes. The pre-existing classes are referred to as base classes, superclasses, or parent classes, and the resulting classes are referred to as derived classes, subclasses, or child classes. Thus, for example, parent classes and child classes may be considered to be related to one another.

However, it will be understood that the embodiments disclosed herein are not limited to object oriented programming languages or techniques. Software modules can be related to one another whether or not they define classes. For example, one module may link, reference or otherwise include code from another module. Such modules may, for purposes of the present disclosure, be considered to be related to one another.

Referring again to FIG. 2, child classes can override methods defined in a parent class. Thus, for example, the class Class_AC in FIG. 2, which is defined as a child class of the parent class Class_A, may override the methods Method_A1 and Method_A2 defined in the parent class, Class_A. In addition, Class_AC may define a new method, Method_C1, that is unique to Class_C. Class_B is a standalone class that includes several methods, but is neither a parent class nor a child class to any other class.

Figure 3:
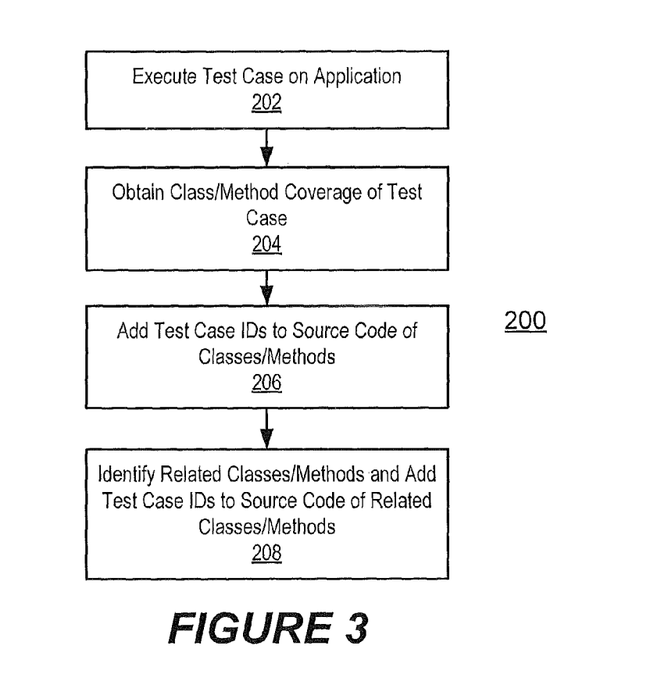
FIG. 3 is a flowchart illustrating operations according to some embodiments.

Within this context, operations according to some embodiments are illustrated in FIG. 3. As shown therein, the operations begin by executing a test case on an application under test (block 202). As discussed above, the test case may be written in a scripting language to test a specific functional area of the application under test. The application under test may be instrumented with a code coverage tool, such as cobertura or EMMA, both of which are code coverage tools for Java based applications. In computer science, code coverage is a measure used to describe the degree to which the source code of a program is tested by a particular test suite. A program with high code coverage may have been more thoroughly tested and may have a lower chance of containing software bugs than a program with low code coverage. Code coverage tools, such as EMMA, keep track of the parts of an application that are executed during a test and generate reports showing the code coverage of a given test.

Accordingly, in block 204, the methods include obtaining the code coverage of the test case. In the case of an object-oriented application, the code coverage may identify the classes/methods invoked during execution of the test case.

The operations then add test case identifiers, or test case IDs, to the source code of classes/methods invoked during execution of the test case (block 206). These operations may be performed by a script that retrieves the test case IDs of the test cases 132 (FIG. 1) and code coverage results from the code coverage tool and inserts the test case IDs into the source code at appropriate locations. For example, if the code coverage tool indicates that a method in a particular class is invoked by a given test case, the test case ID of the test case may be inserted into the comment header of the source code of the class. These operations are illustrated, for example, in FIG. 4A. The script may be provided with a mapping between the details of the executed test cases and the underlying classes/methods covered by the code coverage tool.

In addition to or instead of test case IDs, the script may also insert test set identifiers, or test set IDs, into the source code. A test set ID is a unique identifier of a set of tests in the test management system. The test set may include a collection of test cases that are stored in the test management system and that can be easily identified. The test set ID may be accompanied by the name of a feature associated with the test set or a number of test cases used from the test set.

Figure 4A:
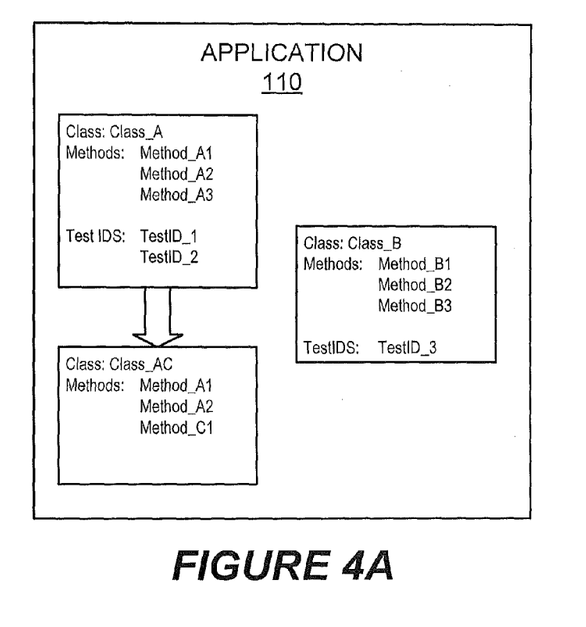
FIGS. 4A-4D are block diagrams illustrating functional portions of example applications under test.

As shown in FIG. 4A, in one example, three test cases may be run against the application 110, namely, test cases having test case IDs TestID_1, TestID_2, and TestID_3. A code coverage tool may report that TestID_1 and TestID_2 invoked Class_A, and that TestID_3 invoked the class Class_B.

The source code may be updated, for example, to include a line such as the following:

```
#TestID_1, TestID_2, TestID_3 or
#TestSetID_1: <feature name>:<#of test cases>, TestSetID_2: <feature name>:<#of test cases>
```

Returning to the flowchart of FIG. 3, the operations then identify classes/methods that are related to the classes/methods to which the test case IDs were added in block 206, and adds the test case IDs to the source code of the related classes/methods (block 208).

The operations of block 208 may be performed, for example, using a script that identifies dependencies between classes and methods using a feature similar to the Eclipse IDE feature (http://www.eclipse.org/), which is well known in the art. The script may construct a map that describes the dependencies between classes and methods. The script may insert the test case IDs or test set IDs into comments in the dependent classes/methods.

It will be appreciated that the order of operations described above is not critical. Thus, for example, in some embodiments, the operations may identify the classes/methods that are related to the classes/methods identified by the code coverage tool before inserting the test case IDs into the classes/methods identified by the code coverage tool. For example, all of the affected classes/methods may be identified in a first step and then, in a second step, the test case IDs may be selectively inserted into the source code of the identified classes/methods.

Figure 4B:
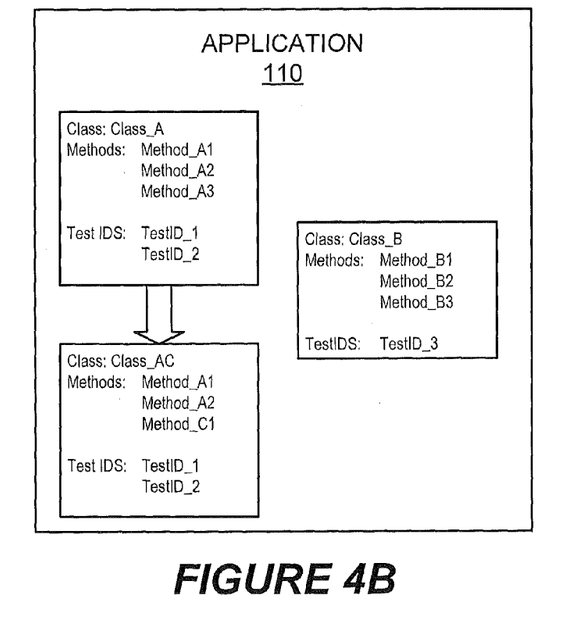

These operations are illustrated, for example, in FIG. 4B, which shows that test case IDs TestID_1 and TestID_2 may be inserted into the source code of class Class_AC because Class_AC is a child class of Class_A, even though the code coverage tool did not indicate that the test cases associated with TestID_1 and TestID_2 invoked Class_AC.

Figure 4C:
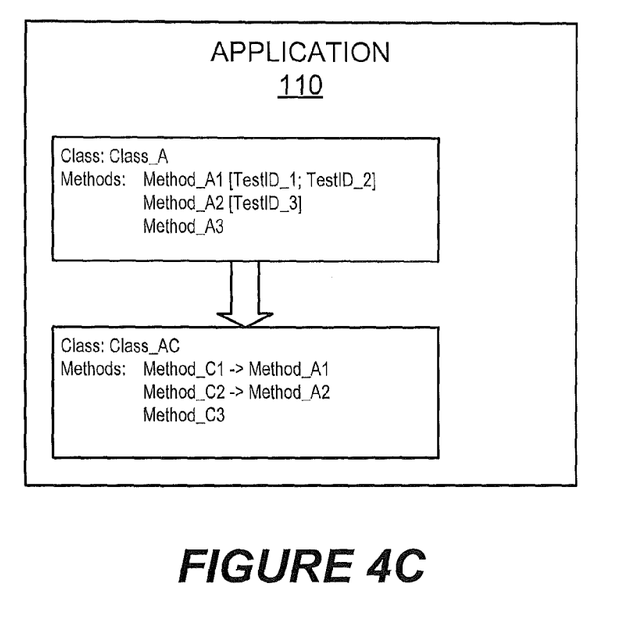
Figure 4D:
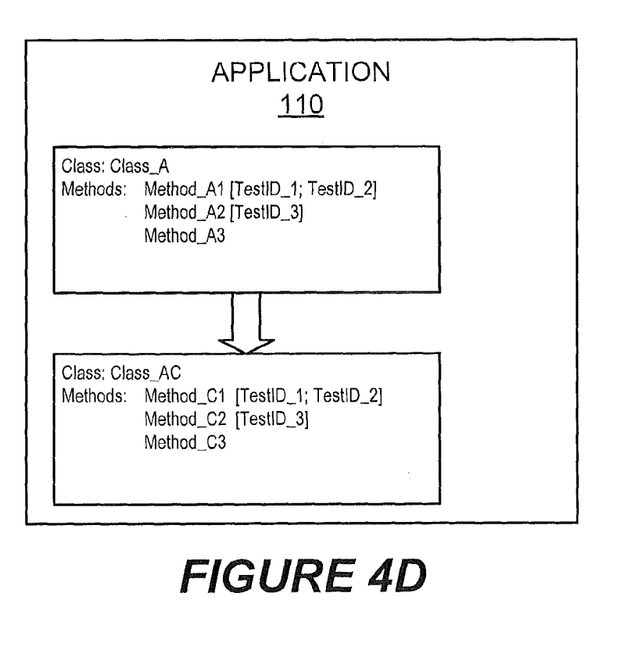

FIGS. 4C and 4D illustrate some other examples of inserting test case IDs into source code. In the examples shown therein, test case IDs are inserted into the source code of specific methods defined in the classes. For example, the code coverage tool may report that Method_A1 is invoked by test cases TestID_1 and TestID_2, and that Method_A2 is invoked by test case TestID_3. Class_AC includes two methods, Method_C1 and Method_C2 that call the affected methods Method_A1 and Method_A2.

Referring to FIG. 4D, because Method_C1 and Method_C2 call Method_A1 and Method_A2, the test case IDs may be inserted into the source code for Method_C1 and Method_C2, respectively.

As explained above, when software is modified in any way, it is highly desirable to perform regression testing to ensure both that the new code operates as intended, and also that the new code does not adversely affect the operation of the existing code. However, performing a full regression test using all of the test cases generated during the initial testing phase may be costly and time consuming.

Figure 5:
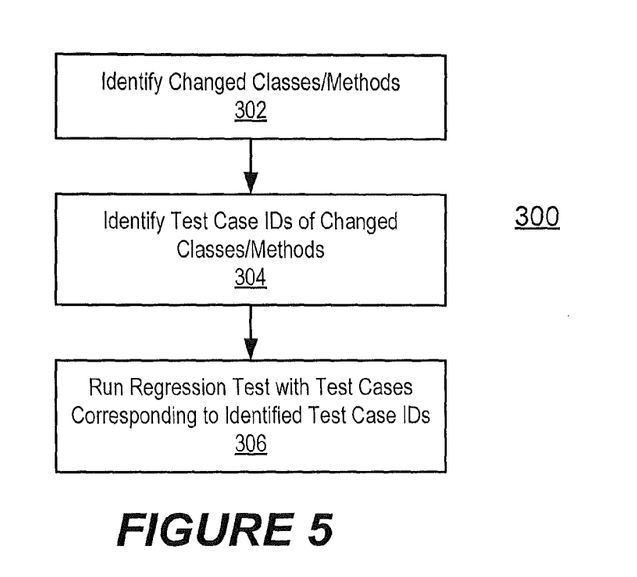
FIG. 5 is a flowchart illustrating operations according to some embodiments.

Operations according to further embodiments are illustrated in the flowchart of FIG. 5. As shown therein, the operations include identifying classes or methods of an application that have been changed (block 302). Automatic identification of changed classes/methods may be performed by comparing the source code, revision date, file date or other aspect of the original application with the corresponding attribute of the source code of the revised application and noting any classes/methods that have been changed. A report of the changed classes/methods may be generated for every build, and may provide details of the classes/methods that are changed from the previous build using generic utilities or source code specific API's.

The operations then identify the test case IDs or test set IDs of the classes/methods that have changed (block 304). Referring to blocks 206, 208 of FIG. 3, since the test case/set IDs were inserted into the source code of the classes/methods, the test case/set IDs may be simply extracted from the source code of the classes/methods that are identified as having been changed.

Finally, the test cases associated with the test case IDs identified in block 304 may be run as a regression test against the application under test (block 306). This may be performed programmatically, for example, by a script that populates and initiates the regression test cases automatically.

As described above, the regression test may not be run solely using test cases that invoked the changed classes/methods, but also using test cases that invoked classes/methods that are related to the changed classes/methods, such as classes/methods that are dependent in some way on the changed classes/methods.

Figure 6:
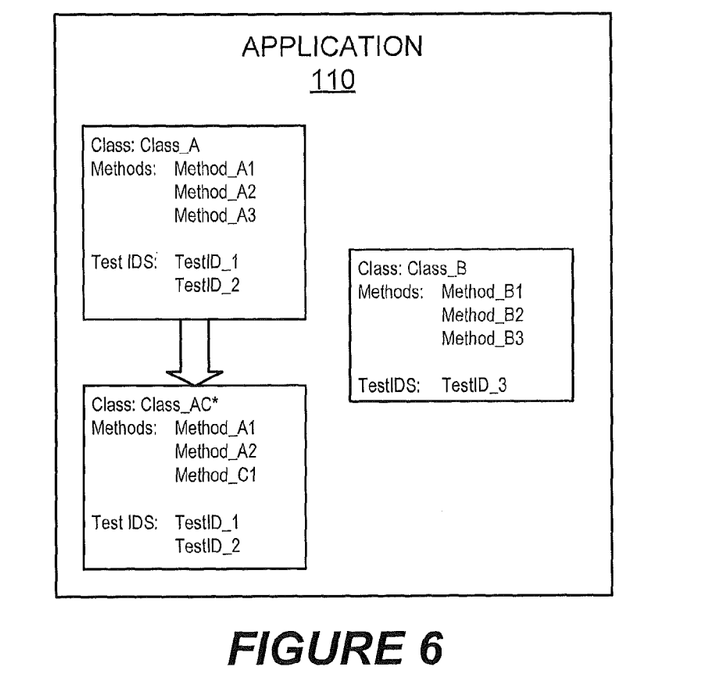
FIG. 6 is a block diagram illustrating functional portions of an example application under test.

These embodiments are illustrated, for example, in FIG. 6. As shown therein, Class_AC may be identified as a changed class by the operations of block 304 (FIG. 5), as evidenced by the asterisk by the class name. The test case IDs TestID_1 and TestID_2 have been inserted into the source code for Class_AC. Thus, a regression test may include the test cases associated with TestID_1 and TestID_2, even if the initial running of the test cases associated with TestID_1 and TestID_2 did not invoke Class_AC, and the test IDs were only included in the source code for Class_AC because of its relationship to Class_A.

Figure 7:
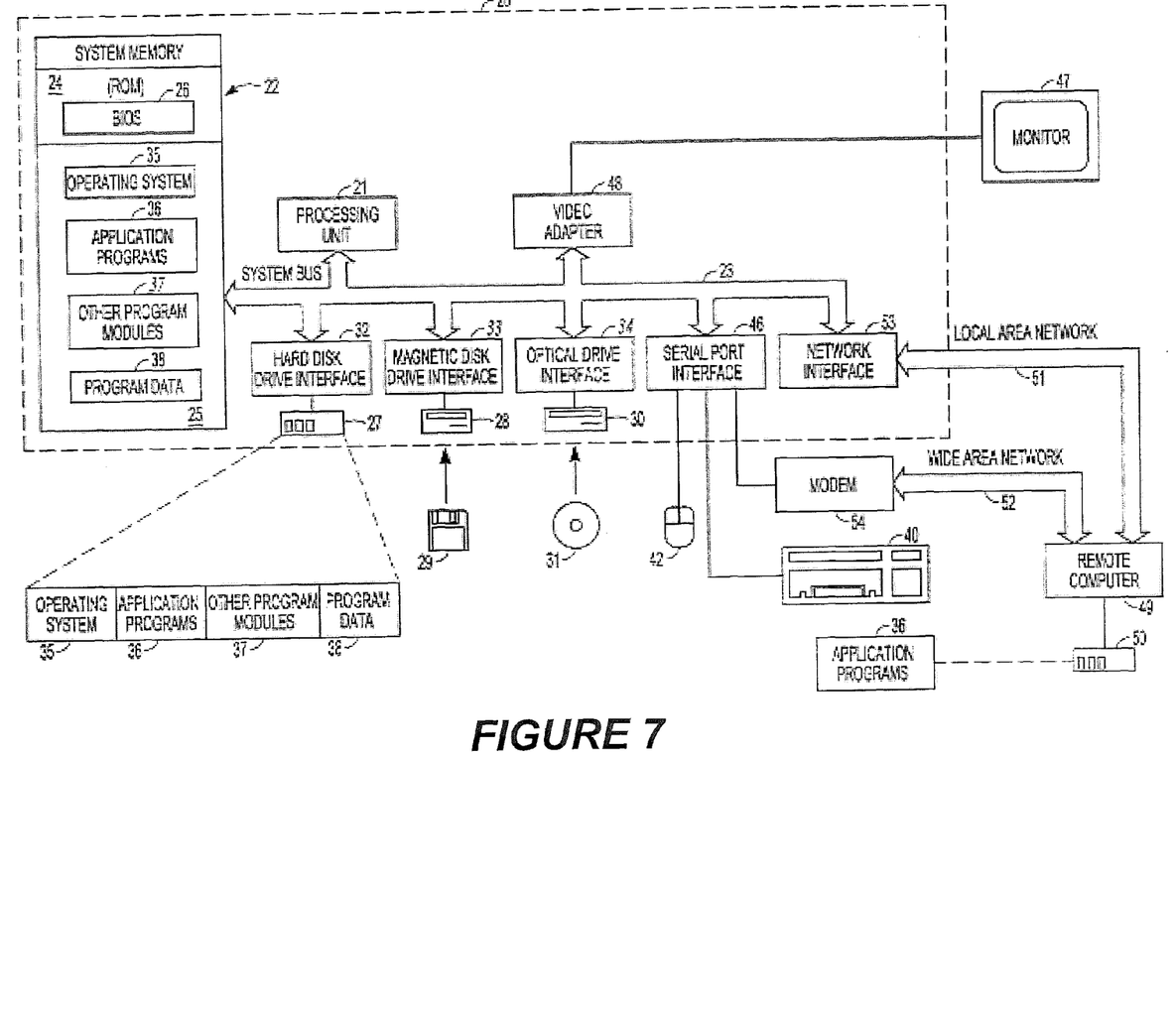
FIG. 7 is a block diagram illustrating a computer system for operating a regression testing tool according to some embodiments.

FIG. 7 provides an overview diagram of a suitable computer hardware and computing environment in conjunction with which various embodiments may be practiced. The description of FIG. 7 is intended to provide a brief, general description in conjunction with which the invention may be implemented. In some embodiments, the invention is described in the general context of computer-executable instructions, such as program modules, being executed by a computer, such as a personal computer. Generally, program modules include routines, programs, objects, components, data structures, and the like, that perform particular tasks or implement particular abstract data types.

In the embodiment shown in FIG. 7, a hardware and operating environment is provided that is applicable to the various software applications and tools described in the other figures and described above. It can be appreciated that the following hardware and operating environment might be used in connection with the development of the software application to be tested, the use and operation of the test case automation tool, the use and operation of integrated third party test tools, or the deployment of the software application to be tested.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. As used herein, a "processor" includes one or more processors, microprocessors, computers, co-processors, graphics processors, digital signal processors, arithmetic logic units, system-on-chip processors, etc. The invention may also be practiced in distributed computer environments where tasks are performed by I/O remote processing devices that are linked through a communications network. In a distributed computing environment, program modules may be located in both local and remote memory storage devices.

In the embodiment shown in FIG. 7, a hardware and operating environment is provided that is applicable to any of the servers or remote clients shown in the other figures. As shown in FIG. 7, one embodiment of the hardware and operating environment includes a general purpose computing device in the form of a computer 20 (e.g., a personal computer, workstation, or server), including one or more processing units 21, a system memory 22, and a system bus 23, that operatively couples various system components, including the system memory 22 to the processing unit 21. There may be only one or more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory 22 can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. Programming for implementing one or more processes or methods described herein may be resident on any one or number of these computer-readable media.

A user may enter commands and information into computer 20 through input devices such as a keyboard 40 and pointing device 42. Other input devices (not shown) can include a microphone, joystick, game pad, satellite dish, seamier, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a GUI for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to the computer 20, or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 8 include a local area network (LAN) 51 or a wide area network (WAN) 52. Such networking environments are commonplace in office networks, enterprise-wide computer networks, intranets and the Internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device), or any other type of communications device (e.g., a wireless transceiver), for establishing communications over the WAN 52, such as the internet. The modem 54, which may be internal or external, is connected to the system bus 23 via the serial port interface 46. In a networked environment, program modules depicted relative to the computer 20 can be stored in the remote memory storage device 50 of remote computer/server 49. It is appreciated that the network connections shown are exemplary and other means of, and communications devices for, establishing a communications link between the computers may be used including hybrid fiber-coax connections, T1-T3 lines, DSL's, OC-3 or OC-12, TCP/IP, microwave, wireless application protocol, and any other electronic media through any suitable switches, routers, outlets and power lines, as the same are known and understood by one of ordinary skill in the art.

Thus, example systems, methods, and tangible machine readable media for identifying test cases for regression testing and performing regression testing using the identified test cases have been described. These systems/methods may be integrated with existing code management tools to provide a completely automated regression test system.

As will be appreciated by one of skill in the art, the present inventive concepts may be embodied as a method, data processing system, or computer program product. Furthermore, the present inventive concepts may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations or block diagrams of methods, systems and computer program products. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations described herein may be written in an object oriented programming language such as Java® or C++. However, the computer program code for carrying out operations described herein may also be written in conventional procedural programming languages, such as the "C" programming language. The program code may execute entirely on the user's computer, partly on the user's computer, as a standalone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

What is claimed is:

1. A method, comprising:
   executing a test case against an application under test on a programmable digital computer wherein the application under test comprises an object oriented application program;
   obtaining from the programmable digital computer an identity of a first code module of the application under test that is invoked by the test case;
   associating the test case identifier with the first code module;
   identifying a second code module of the application under test that is related to the first code module, wherein the first code module comprises a first object oriented class, and wherein the second code module comprises a parent class or child class of the first object oriented class; and
   associating the test case identifier with the second code module.

2. The method of claim 1, wherein associating the test case identifier with the first code module comprises adding the test case identifier to source code for the first code module, and wherein associating the test case identifier with the second code module comprises adding the test case identifier to source code for the second code module.

3. The method of claim 1, further comprising:
   determining that source code for the first code module has changed;
   identifying the test case identifier associated with the first code module; and
   executing the test case associated with the test case identifier using the application under test.

4. The method of claim 1, wherein the first code module comprises a first method, and wherein the second code module comprises a second method that overrides the first method.

5. The method of claim 1, wherein obtaining from the programmable digital computer an identity of the first code module invoked by the test case comprises determining identities of classes or methods invoked by the application under test while executing the test case.

6. The method of claim 1, wherein identifying the second code module that is related to the first code module comprises identifying code modules in the application under test that are called by the first code module.

7. The method of claim 1, wherein identifying the second code module that is related to the first code module comprises identifying code modules in the application under test that call the first code module.

8. A computer program product for performing software regression testing, the computer program product comprising:
   a tangible computer readable storage medium having computer readable program code embodied in the medium, the computer readable program code comprising computer readable program code configured to:
   execute a test case against an application under test on a programmable digital computer;
   obtain from the programmable digital computer an identity of a first code module of the application under test that is invoked by the test case;
   associate the test case identifier with the first code module;
   identify a second code module of the application under test that is related to the first code module, wherein the first code module comprises a first class, and wherein the second code module comprises a parent class or child class of the first class; and
   associate the test case identifier with the second code module.

9. The computer program product of claim 8, wherein the computer readable program code configured to associate the test case identifier with the first code module comprises computer readable program code configured to add the test case identifier to source code for the first code module, and wherein the computer readable program code configured to associate the test case identifier with the second code module comprises computer readable program code configured to add the test case identifier to source code for the second code module.

10. The computer program product of claim 8, further comprising:
    computer readable program code configured to determine that source code for the first code module has changed;
    computer readable program code configured to identify the test case identifier associated with the first code module; and
    computer readable program code configured to execute the test case associated with the test case identifier using the application under test.

11. The computer program product of claim 8, wherein the first code module comprises a first method, and wherein the second code module comprises a second method that overrides the first method.

12. The computer program product of claim 8, wherein the computer readable program code configured to obtain from the programmable digital computer an identity of the first code module invoked by the test case comprises computer readable program code configured to determine identities of classes or methods invoked by the application under test while executing the test case.

13. The computer program product of claim 8, wherein the computer readable program code configured to identify the second code module that is related to the first code module comprises computer readable program code configured to identify code modules in the application under test that are called by the first code module.

14. The computer program product of claim 8, wherein the computer readable program code configured to identify the second code module that is related to the first code module comprises computer readable program code configured to identify code modules in the application under test that call the first code module.

15. A computer system, comprising:
    a processor; and
    a memory coupled to the processor, the memory comprising computer readable program code embodied therein that, when executed by the processor, causes the processor to perform operations comprising:
    executing a test case against an application under test on a programmable digital computer;

obtaining from the programmable digital computer an identity of a first code module of the application under test that is invoked by the test case;

associating the test case identifier with the first code module;

identifying a second code module of the application under test that is related to the first code module; and associating the test case identifier with the second code module;

wherein associating the test case identifier with the first code module comprises adding the test case identifier to source code for the first code module.

* * * * *